April 14, 1970     H. PROJANSKY     3,505,954
CREDIT CARD AND THE LIKE
Filed Nov. 8, 1967     2 Sheets-Sheet 1
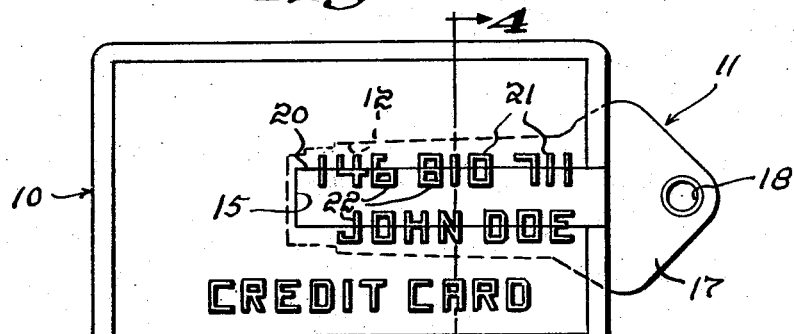
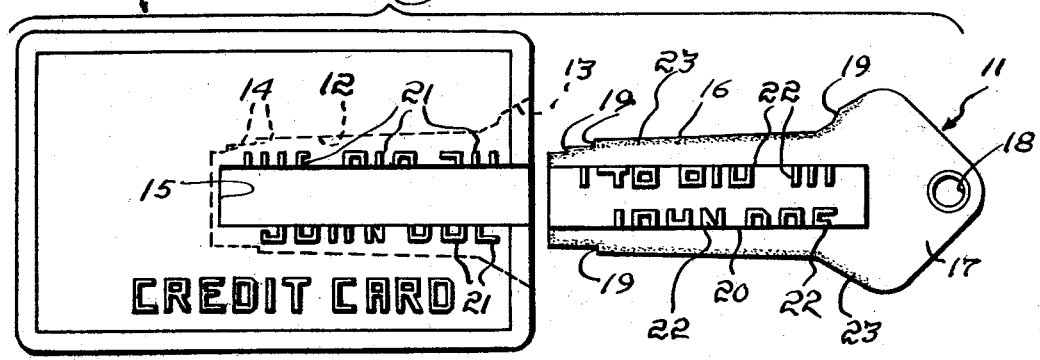
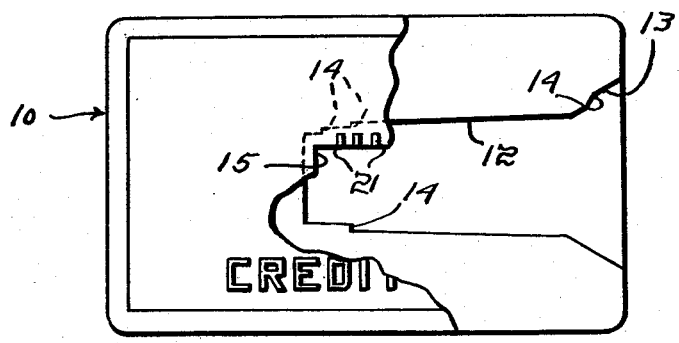
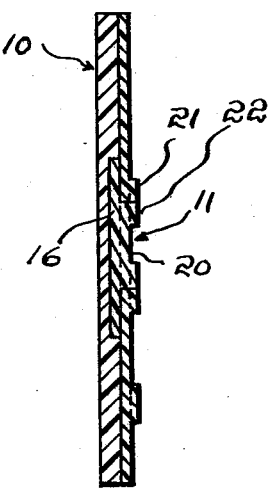
Inventor:
Henry Projansky,
by Abbot Spear,
Attorney April 14, 1970   H. PROJANSKY   3,505,954
CREDIT CARD AND THE LIKE
Filed Nov. 8, 1967   2 Sheets-Sheet 2
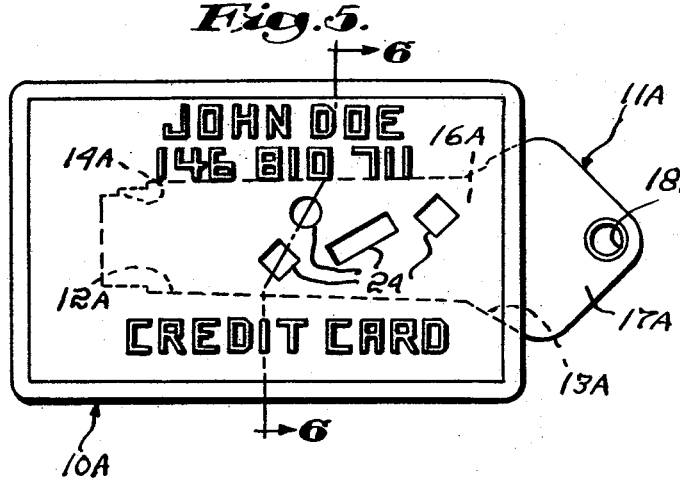
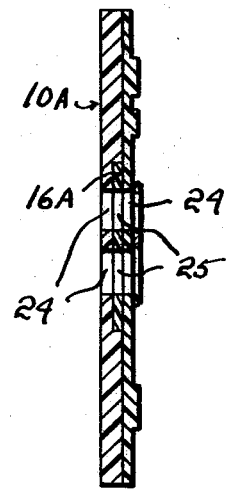
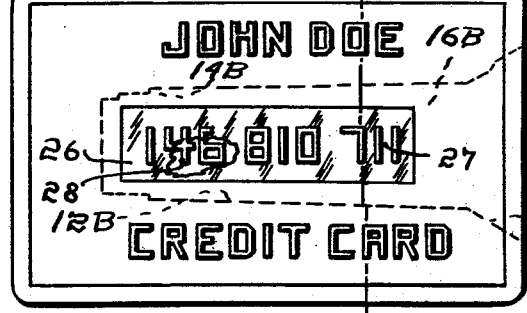
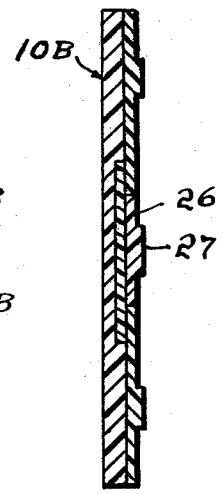
Inventor:
Henry Projansky,
by Abb Spear,
Attorney

United States Patent Office 3,505,954
Patented Apr. 14, 1970

---

3,505,954
CREDIT CARD AND THE LIKE
Henry Projansky, 1560 Jefferson Ave.,
Miami Beach, Fla. 33139
Filed Nov. 8, 1967, Ser. No. 681,432
Int. Cl. B41n 1/12; G09f 3/00
U.S. Cl. 101—369                4 Claims

---

ABSTRACT OF THE DISCLOSURE

Credit card and the like consisting of a card part having a slideway opening through an edge and a key part slidably entrant of the slideway, the two parts bearing indicia which have a predetermined relationship when the key part is entered into the slideway to a predetermined extent, said relationship establishing that the correct parts are being used together.

---

The widespread use of credit cards is evidence of the convenience they afford their users. Unfortunately, credit cards are lost or stolen and their unauthorized use represents a heavy financial loss to the concerns issuing them.

The general objective of the invention is to provide credit cards, each card including two parts that are to be kept separate but which must be used together in order for the credit card to be accepted by a seller to justify a sale on credit. While two part credit cards have been proposed, they have not been acceptable, largely because counterfeiting of a part was relatively easy, an objectionable feature avoided by the present invention by providing that each part must bear indicia having a predetermined relationship when one card part is used with another only in a predetermined manner that is apparent to the user.

While the invention is herein discussed with particular reference to credit card uses, it may be used as an identification card, pass, license, or as a part of a check book as other examples of its uses.

In accordance with the invention, its general objective is attained by providing a credit card consisting of a card part having a slideway opening through an edge thereof to receive a key part in a predetermined manner. The two parts are provided with indicia which have a predetermined relationship only when the correct key part is entered within the slideway with the indicia otherwise establishing that neither card part is appropriate for use with the other. The key part desirably is to be kept separate from the card part, on a key ring or chain or in a key container along with other keys that must be safeguarded by the card owner.

An important objective of the invention is to provide key part and keyway constructions that will substantially eliminate any chance of misuse. In practice, the key part and keyway may include portions that fit to permit the key part to be entered into the slideway to a predetermined extent such that the indicia may have the required predetermined relationship and desirably such portions also prevent any sidewise movement of the thus entered key portion. In addition, it is important that the key portion be incapable of being altered without bearing evidence of such tampering. This important result is attained by molding the key parts with such marginal portions and with a surface that will show attempted alterations.

Another objective is to provide that the credit card part has a slot in its front face opening into the slideway and extending lengthwise thereof and that the key part includes a ridge entrant of that slot and with indicia on the ridge and the indicia along at least one side of the slot having a predetermined relationship when the key has been entered into the slideway to a predetermined extent. With the surface of the ridge coplanar with that of the front face of the card, the indicia may be embossed thus to show in the printed ticket which is used in accounting.

Another objective of the invention is to have the credit card part provided with holes opening through the slideway and with the key part having holes identical in size, shape, and disposition thus to register when the key part is inserted to the desired extent.

Yet another objective of the invention is to provide a credit card part with a window portion over a central portion of the slideway with indicia on the window and identical indicia on the key but of a color contrasting with the color of indicia on the window and blocked out if the key is properly seated.

In the accompanying drawings, there are shown embodiments of the invention illustrative of these and other of its objectives, novel features, and advantages.

In the drawings:

FIGURE 1 is a view of the front face of a credit card in accordance with the invention, FIGURE 2 is a like view but with the key part withdrawn from the card part, FIGURE 3 is a like view of the card part but with the card part partly broken away to show the slideway, FIGURE 4 is a section taken approximately along the indicated lines 4—4 of FIGURE 1, FIGURE 5 is a view, similar to FIGURE 1, illustrating another embodiment of the invention, FIGURE 6 is a section taken approximately along the indicated lines 6—6 of FIGURE 5, FIGURE 7 is a view, similar to FIGURES 1 and 6, illustrating yet another embodiment of the invention, and FIGURE 8 is a section taken approximately along the indicated lines 8—8 of FIGURE 7.

In the embodiment of the invention illustrated by FIGURES 1–4, a credit card is shown as including a card part, generally indicated at 10 and a key part, generally indicated at 11, both desirably molded from a suitable plastic or formed from molded plastic laminates.

The card part 10 has a slideway 12 opening through one edge or side, the slideway decreasing in width towards its closed end and having a flared entrance 13 and with its margins provided with shoulders 14. An open-ended slot 15 in the front face of the card part 10 is in lengthwise communication with the slideway 12 and is shown as spaced from its margins.

The key part 11 has a main portion 16 complemental in size and shape to the slideway 12 including its entrance 13 and a head portion 17 having a hole 18 to enable it to be attached to a key chain, ring, or holder. The main portion 16 thus has shoulders 19 for mating engagement with the slideway shoulders 14. A flat surfaced ridge 20 is shown as extending from end-to-end of the main portion 16 and it is of the same size and shape as the slot 15 of the card part 10. When the key part 11 is seated in the slideway 12, the upper surface of the ridge 20 is flush with the front face of the card part 10.

Both the card part 10 and the key part 11 have indicia 21 and 22, respectively, and these have a predetermined relationship when the key part has been inserted into the slideway 12 to the predetermined extent established by its shape. Thus a key part that cannot be inserted to the predetermined extent, either too far or not far enough, will result in the indicia not having the desired relationship. As shown in FIGURES 1–4, the indicia is disposed marginally of the open-ended slot 15 and of the ridge portion 20 and desirably, but not necessarily, in their predetermined relationship, the indicia establishes the name, number, or both of the credit card owner. In that case, one-half of each letter or digit is on the card part 10 and its other half is on the ridge 20 of the key part 11.

It is preferred that the indicia on both parts be embossed thus to appear on the printed tickets. In addition, it is preferred that the margins of the main portion 16 of the key part 11 have surface characteristics that are formed during molding and that are destroyed if an attempt is made to change its margins, such surfaces being indicated by surface roughness at 23. Surface characteristics may be otherwise established with color being another example. Surface roughness or surface coloring on the key margin make it extremely difficult to alter the key edges without affecting the margins and the damaged area could not be easily repaired.

The embodiment of the invention illustrated by FIGURES 5 and 6 is generally similar and like parts are distinguished by the suffix addition "A" to the appropriate reference numerals.

In this embodiment of the invention, the card part 10A has a series of holes 24 extending through it in the slideway 12A and these preferably are of different sizes and shapes. The key part 11A has a series of holes 25 extending therethrough and these are identical in size, shape and disposition to the holes 24 so that they will register therewith if the correct key part 11A is used with the card part 10A and is fully inserted in its slideway 12A. Desirably, the margins of the holes 24 in the front face of the card part 10A are raised by embossing.

The embodiment of the invention illustrates by FIGURES 7 and 8 is similar to the previously described embodiments. Its corresponding parts are, accordingly, distinguished by the suffix addition "B" to the appropriate reference numerals. In this embodiment, the front face of the card part 10B has a window 26 opening into the slideway 12B. The window is provided with indicia 27, a credit card number, for one example, desirably embossed and colored. The key part 11B has the same indicia 28, printed or otherwise formed on it, the indicia being disposed to be blocked out by the indicia 27 when the correct key part 11B is fully seated in the slideway 12B of the card part 10B. The indicia 28 is of a color sufficiently different from that of the indicia 27 to make any failure in registry to be readily apparent.

From the foregoing, it will be apparent that unless the owner leaves the key part of a credit card in accordance with the invention, in the card part thereof, it is uplikely that both parts will fall into unauthorized hands. No matter which part is lost, duplication of the missing part is too difficult to make is worthwhile to attempt. While the invention has been discussed primarily in relation to credit card uses, it will be apparent that its features can be incorporated in card-like parts to be combined with checkbooks, for example, or used separately as for identification purposes.

I claim:

1. A two piece credit card and the like comprising a card part having an undercut slideway opening through one edge and a slot opening through the front face into and extending lengthwise of the slideway inwardly of at least one of its margins and a key part that is slidable in said slideway, both of said parts having indicia arranged to have a predetermined relationship when said key part is entered into said slideway to a predetermined extent, at least some of the card part indicia being along at least one side of the slideway, said key part and said slideway within said undercut including complemental marginal portions mutually engageable to establish said predetermined extent as said key part is slid into said slideway, and said key part including a ridge slidably fitting the card part slot with key part indicia on the upper surface of the ridge part.

2. The credit card of claim 1 in which the indicia marginally of the slot and on the ridge are embossed and approximately coplanar when the key part is entered in the slideway.

3. The credit card of claim 1 in which the indicia on the card part are each a part of each digit of the credit card number and the indicia on the ridge are each the other part of each of said digits.

4. The credit card of claim 1 in which the indicia on the card part are each a part of each letter of the name of the credit card owner and the indicia on the ridge are each the other part of each letter.

References Cited

UNITED STATES PATENTS

| | | | |
|---|---|---|---|
| 1,855,398 | 4/1932 | Johnson | 101—369 |
| 2,032,459 | 3/1936 | Allen | 101—369 |
| 2,573,570 | 10/1951 | Howard | 101—369 |
| 2,810,343 | 10/1957 | Owen | 101—369 |
| 2,898,257 | 8/1959 | Carver | 40—2.2 |
| 1,414,666 | 5/1922 | Poliuka | 40—2.2 |
| 2,935,941 | 5/1960 | Bradford | 101—369 |
| 3,283,713 | 11/1966 | Wooster | 101—369 |
| 3,287,839 | 11/1966 | Rotwein et al. | 283—7 |

ROBERT E. PULFREY, Primary Examiner

E. H. EICKHOLT, Assistant Examiner

U.S. Cl. X.R.

40—2.2